United States Patent
Wilson et al.

(10) Patent No.: US 11,512,645 B2
(45) Date of Patent: Nov. 29, 2022

(54) SOLID-PROPELLANT GAS GENERATOR ASSEMBLIES AND METHODS

(71) Applicant: GOODRICH CORPORATION, Charlotte, NC (US)

(72) Inventors: Brian Wilson, Vacaville, CA (US); Kevin Mueller, Dixon, CA (US)

(73) Assignee: Goodrich Corporation, Charlotte, NC (US)

( * ) Notice: Subject to any disclaimer, the term of this patent is extended or adjusted under 35 U.S.C. 154(b) by 4 days.

(21) Appl. No.: 16/811,673

(22) Filed: Mar. 6, 2020

(65) Prior Publication Data
US 2021/0277831 A1 Sep. 9, 2021

(51) Int. Cl.
| F15B 15/19 | (2006.01) |
| F02C 7/272 | (2006.01) |
| F02K 9/95  | (2006.01) |
| F42B 3/04  | (2006.01) |
| F02C 7/32  | (2006.01) |

(52) U.S. Cl.
CPC ............... *F02C 7/272* (2013.01); *F02K 9/95* (2013.01); *F15B 15/19* (2013.01); *F02C 7/32* (2013.01); *F05D 2260/85* (2013.01); *F15B 2211/218* (2013.01); *F42B 3/04* (2013.01)

(58) Field of Classification Search
CPC .... F02C 7/272; F15B 15/19; F15B 2211/218; F42B 3/04–06
See application file for complete search history.

(56) References Cited

U.S. PATENT DOCUMENTS

| 2,289,318 A | * | 7/1942 | Pratt | F42B 3/04 102/530 |
| 2,411,552 A | * | 11/1946 | New | F02C 7/27 60/786 |
| 2,648,283 A | * | 8/1953 | Coursen | F42B 3/06 138/89 |
| 2,780,961 A | * | 2/1957 | Walton | F42B 3/006 89/1.14 |

(Continued)

FOREIGN PATENT DOCUMENTS

GB 2460246 A * 11/2009 ............. B64C 27/12

OTHER PUBLICATIONS

Mishra, D. P. (2017). Fundamentals of Rocket Propulsion. Taylor & Francis, pp. 161-194. Retrieved from https://app.knovel.com/hotlink/toc/id:kpFRP00015/fundamentals-rocket-propulsion/fundamentals-rocket-propulsion (Year: 2017).*

(Continued)

*Primary Examiner* — Todd E Manahan
*Assistant Examiner* — Marc J Amar
(74) *Attorney, Agent, or Firm* — Snell & Wilmer L.L.P.

(57) ABSTRACT

A solid-propellant gas generator assembly may comprise a bulkhead having an orifice disposed in a housing. The bulkhead may be disposed between a first end and a second end of the housing. The bulkhead and the first end may define a propellant cavity. The bulkhead and the second end may define a pressure chamber. A fast burning solid-propellant may be disposed in the propellant cavity. The solid-propellant gas generator assembly may be configured to replace a slow burning solid-propellant gas generator system in a solid-propellent gas generator system.

5 Claims, 4 Drawing Sheets

(56) References Cited

U.S. PATENT DOCUMENTS

| | | | | | |
|---|---|---|---|---|---|
| 2,922,050 | A | * | 1/1960 | Loughran | F02K 9/72 290/40 A |
| 2,971,097 | A | * | 2/1961 | Corbett | F02K 9/70 290/2 |
| 2,979,896 | A | * | 4/1961 | Perkins, Jr. | F42B 3/04 123/183.1 |
| 2,986,005 | A | * | 5/1961 | Dudley | F02C 7/272 60/789 |
| 3,077,736 | A | * | 2/1963 | Feeley, Jr. | F02C 7/272 60/39.47 |
| 3,136,122 | A | * | 6/1964 | McJones | F02K 9/26 60/39.47 |
| 3,217,651 | A | * | 11/1965 | Braun | F02K 9/12 102/287 |
| 3,886,745 | A | * | 6/1975 | Kaida | B60T 7/12 60/533 |
| 4,591,314 | A | * | 5/1986 | Weber | F04B 17/00 417/381 |
| 4,599,044 | A | * | 7/1986 | Jacobson | F02K 9/805 60/39.47 |
| 4,671,744 | A | * | 6/1987 | Shaffer | F02C 7/272 417/381 |
| 5,303,631 | A | * | 4/1994 | Frehaut | F15B 15/19 60/637 |
| 6,993,915 | B2 | | 2/2006 | Kung et al. | |
| 7,017,944 | B2 | | 3/2006 | Edwards, II et al. | |
| 7,032,778 | B2 | * | 4/2006 | Bock | B64D 25/14 280/736 |
| 7,690,153 | B2 | * | 4/2010 | Pelz | B64C 1/1423 49/141 |
| 8,052,169 | B2 | | 11/2011 | Yano et al. | |
| 8,362,408 | B2 | | 1/2013 | Carlson | |
| 9,970,462 | B2 | | 5/2018 | Coppedge et al. | |
| 10,281,248 | B2 | | 5/2019 | Dunaway | |
| 10,443,545 | B2 | | 10/2019 | Salois et al. | |
| 11,033,997 | B1 | * | 6/2021 | Jones | B29B 13/024 |
| 2004/0135356 | A1 | * | 7/2004 | Katsuda | B60R 21/26 280/739 |
| 2005/0188701 | A1 | * | 9/2005 | Kung | F02C 1/00 60/772 |
| 2006/0048871 | A1 | * | 3/2006 | Kawakami | C06B 45/00 149/45 |
| 2009/0211239 | A1 | * | 8/2009 | Askeland | F15B 1/24 60/327 |
| 2010/0116384 | A1 | * | 5/2010 | Mendenhall | C06B 23/001 149/2 |
| 2013/0019587 | A1 | * | 1/2013 | Hoffman | F02K 9/80 29/890.01 |
| 2014/0084600 | A1 | * | 3/2014 | Lamat | E05B 65/10 292/92 |
| 2015/0128592 | A1 | * | 5/2015 | Filiputti | F02C 7/272 60/632 |
| 2016/0131459 | A1 | * | 5/2016 | Marlin | F42B 3/006 102/530 |

OTHER PUBLICATIONS

K.L. and B.J. Kosanke, Selected Pyrotechnic Publications of K.L. and B.J. Kosanke, Journal of Pyrotechnics; 1st edition, pp. 275-288 (i.e., chapter titled "Control of Pyrotechnic Burn Rate" placed on internet in Jul. 2020) (Year: 2020).*

* cited by examiner

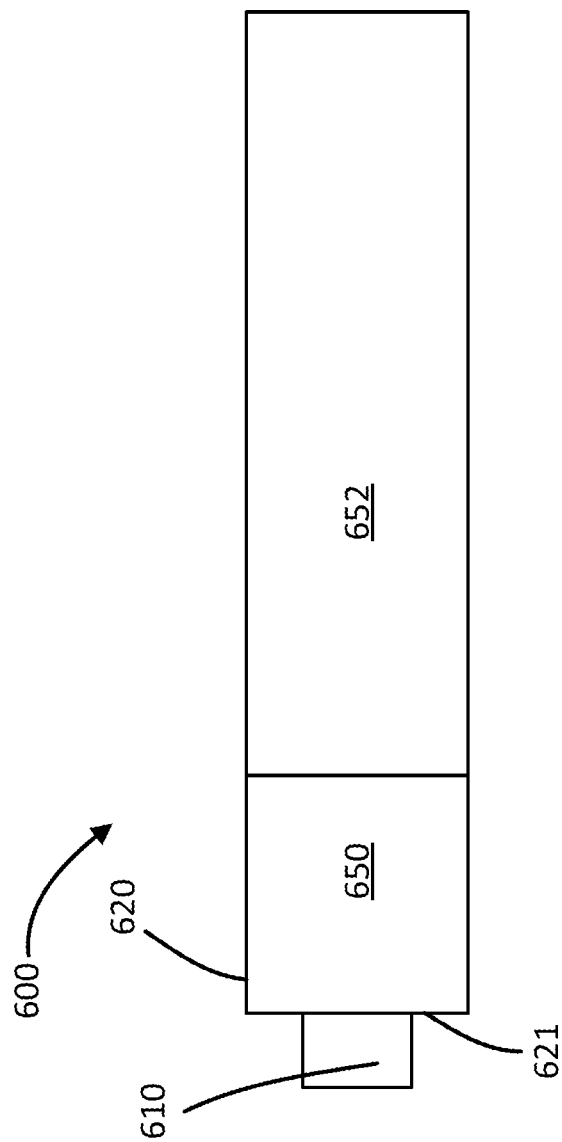

SOLID-PROPELLANT GAS GENERATOR ASSEMBLIES AND METHODS

FIELD

The present disclosure relates to solid-propellant gas generators, and more specifically, to orifice governed gas generators.

BACKGROUND

High output slow burning gas generators will typically require the use of a slow burning propellant. Slow burning propellant may encompass a larger envelope than fast burning propellant, resulting in a larger part envelope. Slow burning propellants may typically be utilized when mechanical work is performed downstream of a cartridge containing the slow burning propellant.

SUMMARY

A cartridge assembly for use in a slow burning solid-propellant system is disclosed herein. The cartridge assembly may comprise: a housing having a first end, a second end, and a wall extending from the first end to the second end; a bulkhead having an orifice disposed in the housing, a propellant cavity defined between the bulkhead and the first end of the housing, and a pressure chamber defined between the bulkhead and the second end; and a fast burning solid-propellant disposed in the propellant cavity.

In various embodiments, the fast burning solid-propellant comprises at least one of ammonium perchlorate and hydroxyl terminated polybutadiene (HTPB) binders. The cartridge assembly may further comprise a cap coupled to an opening. The opening may be configured to be coupled to a conduit. The cartridge assembly may further comprise an ignition device coupled to the first end of the housing. The pressure chamber may include a first pressure profile substantially similar to a second pressure profile of a slow burning solid-propellant cartridge comprising ammonium nitrate propellant. The orifice may be configured to manage a gas flow between the propellant cavity and the pressure chamber during operation of the cartridge assembly.

A solid-propellant gas generator system is disclosed herein. The solid-propellant gas generator system may comprise: a conduit; a bulkhead disposed in the conduit, the bulkhead comprising an orifice; a mechanical device in fluid communication with the conduit, the bulkhead disposed between a first end of the conduit and the mechanical device, a propellant cavity disposed between the first end and the bulkhead, a pressure chamber disposed between the bulkhead and the mechanical device; and a fast burning solid-propellant disposed in the propellant cavity.

In various embodiments, the mechanical device may comprise a piston configured to translate in the conduit. The mechanical device may be a gas-powered turbine. The solid-propellant gas generator system may further comprise an ignition device coupled to the first end of the conduit, the propellant cavity may experience a higher pressure after ignition relative to the pressure chamber, and the propellant cavity and the pressure chamber may equalize over time. The fast burning solid-propellant may comprise at least one of ammonium perchlorate and hydroxyl terminated polybutadiene (HTPB) binders. The pressure chamber may include a first pressure profile substantially similar to a second pressure profile of a slow burning solid-propellant cartridge comprising ammonium nitrate propellant. The orifice may be configured to manage a gas flow between the propellant cavity and the pressure chamber during operation of the solid-propellant gas generator system.

A method of retro-fitting a solid-propellant gas generator system is disclosed herein. The method may comprise: removing a first cartridge assembly from the solid-propellant gas generator system, the first cartridge assembly including a slow burning solid-propellant; and coupling a second cartridge assembly to the solid-propellant gas generator system, the second cartridge assembly including a fast burning solid-propellant configured to burn faster than the slow burning solid-propellant.

In various embodiments, the slow burning solid-propellant may comprise ammonium nitrate propellant, and the fast burning solid-propellant comprises at least one of ammonium perchlorate and hydroxyl terminated polybutadiene (HTPB) binders. The second cartridge assembly may further comprise a bulkhead having an orifice disposed in a housing of the second cartridge assembly, and the second cartridge assembly may further comprise a propellant cavity defined between a first end of the housing and the bulkhead and a pressure chamber defined between the bulkhead and a second end of the housing. The first cartridge assembly may further comprise a housing defining a cavity, the slow burning solid-propellant disposed in the cavity. The second cartridge assembly may further comprise a bulkhead having an orifice disposed in the housing of the second cartridge assembly. The second cartridge assembly may further comprise a propellant cavity defined between a first end of the housing and the bulkhead and a pressure chamber defined between the bulkhead and a second end of the housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 6 illustrates a cartridge assembly, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein, is a fast burning solid-propellant system for use in a typical slow burning solid-propellant system. In various embodiments, a slow burning solid-propellant may comprise ammonium nitrate propellant, or the like. A fast burning solid-propellant may comprise ammonium perchlorate, hydroxyl terminated polybutadiene (HTPB) binders, or the like. In various embodiments, a fast burning solid-propellant may produce double the output pressure for the same amount of weight as the slow burning solid-propellant. In this regard, in various embodiments, when a fast burning solid-propellant is used in typically slow burning solid-propellant system, the solid-propellant weight may be cut in half. However, to utilize a fast burning solid-propellant in a typically slow burning solid-propellant system, a flow of output gas may be managed and/or regulated to provide a desired pressure to a downstream device, such as a gas powered turbine or a piston.

Figure 1:
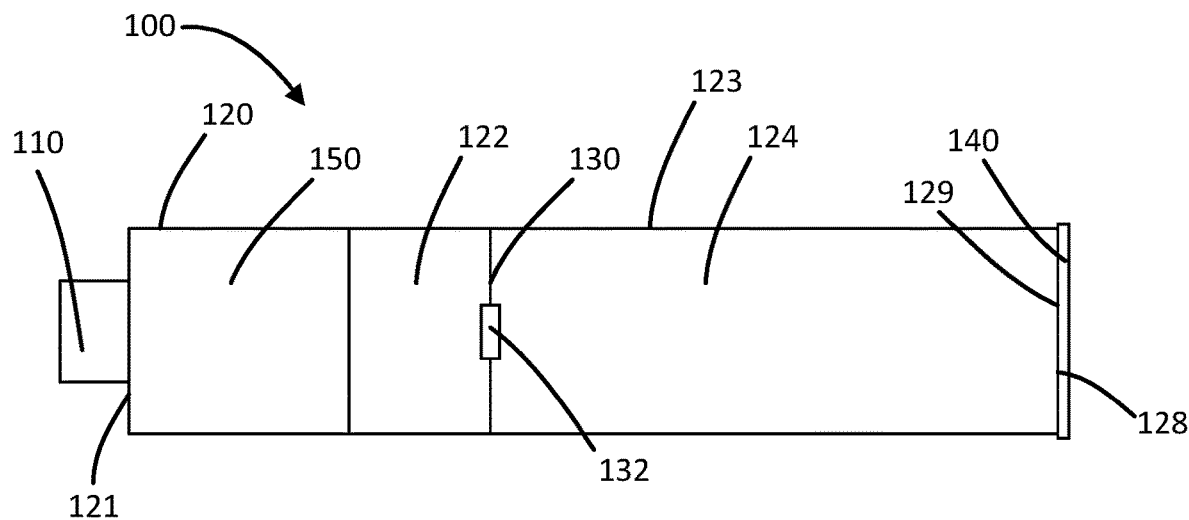
FIG. 1 illustrates a cartridge assembly, in accordance with various embodiments.

Referring now to FIG. 1, a cartridge assembly 100, in accordance with various embodiments, is illustrated. The cartridge assembly 100 may comprise an ignition device 110, a housing 120, and a bulkhead 130. The ignition device 110 may be any ignition device a pyrotechnic ignitor, a low current igniter, or the like. The ignition device 110 may be disposed at a first end 121 of housing 120. The housing 120 may define a wall 123 extending from the first end 121 in an axial direction to a second end 129 of the housing 120. The wall 123 may be annular in shape and/or define a conduit. The bulkhead 130 may extend radially inward from the wall 123 at a location between the first end 121 and the second end 129. The bulkhead 130 may comprise an orifice 132 disposed therein.

In various embodiments, the housing 120 and the bulkhead 130 may define a propellant cavity 122 and a pressure chamber 124. The propellant cavity 122 may be disposed proximate, and be in communication with, the ignition device 110. The pressure chamber 124 may be disposed proximate the second end 129. The second end 129 of the housing 120 may comprise an opening 128. The opening 128 may be configured to be coupled to a conduit in fluid communication with a downstream device configured for mechanical work, such as a gas-powered turbine, a gas-powered piston, or the like. In this regard, the cartridge assembly 100 may be a stand-alone device configured to be coupled to a system configured for mechanical work by a typical slow burning solid-propellant.

Figure 2:
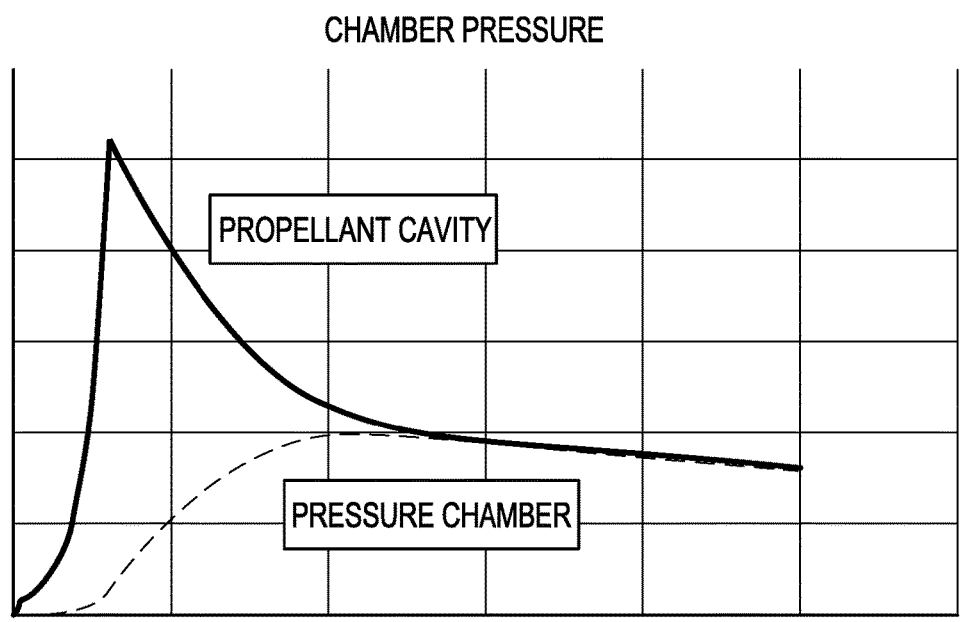
FIG. 2 illustrates a chamber pressure profile of a cartridge assembly, in accordance with various embodiments.

In various embodiments, a fast burning solid-propellant 150 may be disposed in the propellant cavity 122 of the housing. The fast burning solid-propellant 150 may comprise ammonium perchlorate, hydroxyl terminated polybutadiene (HTPB) binders, or the like. The fast burning solid-propellant 150 may be configured to ignite via the ignition device 110 and form a fast burning, high pressure, gas. In various embodiments, the cartridge assembly 100 may be configured to provide a pressure profile over time substantially similar to a slow burning solid-propellant system. For example, with reference to FIG. 2, a pressure provide over time of the propellant cavity 122 compared with the pressure chamber 124 is illustrated, in accordance with various embodiments. In various embodiments, by providing the orifice 132 in the bulkhead 130, the propellant cavity 122 may experience relatively high pressure compared to the pressure chamber 124 for a duration after ignition. Then, the orifice 132 may meter and mange a flow of gas into the pressure chamber 124 and a pressure in the propellant cavity 122 and the pressure chamber 124 may equalize, resulting in a pressure profile of pressure chamber 124 corresponding substantially to a pressure chamber profile for a typical slow burning solid-propellant system.

In various embodiments, the cartridge assembly 100 may comprise a cap 140 disposed at the second end 129 of the housing. The cap 140 may be coupled to the opening 128 at the second end 129 of the housing. In this regard, the cap 140 may seal the housing 120 prior to coupling the cartridge assembly 100 to a system configured for mechanical work by a typical slow burning solid-propellant.

Figure 3:
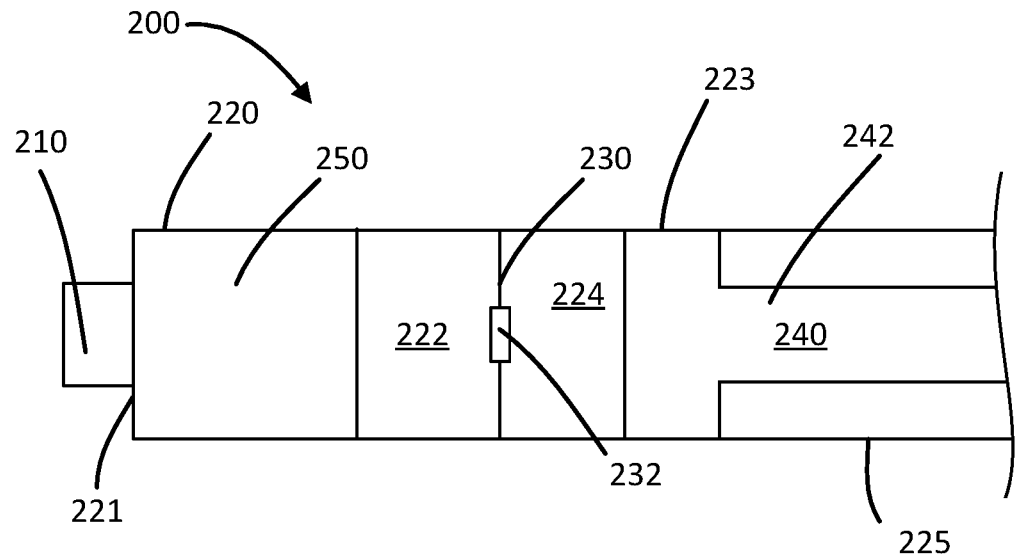
FIG. 3 illustrates a solid-propellant gas generator system, in accordance with various embodiments.

Referring now to FIG. 3, a solid-propellant gas generator system 200, in accordance with various embodiments, is illustrated. The solid-propellant gas generator system 200 may comprise an ignition device 210, a housing 220, a bulkhead 230, and a mechanical device 240. The ignition device 210 may be any ignition device a pyrotechnic ignitor, a low current igniter, or the like. The ignition device 210 may be disposed at a first end 221 of housing 220. The housing 220 may define a wall 223 extending in an axial direction from the first end 221 of the housing 120. The wall 223 may define a conduit 225. The conduit 225 may be annular in shape. The bulkhead 230 may be disposed radially inward from wall 223. The bulkhead 230 may comprise an orifice 232 disposed therein. The bulkhead 230 may be disposed between the mechanical device 240 and the first end 221.

In various embodiments, the housing 220, the bulkhead 330, and the mechanical device 240 may define a propellant cavity 222 and a pressure chamber 224. The propellant cavity 222 may be disposed between the bulkhead 230 and the first end 221. The propellant cavity 222 may be in communication with, the ignition device 210. The pressure chamber 224 may be disposed between the bulkhead 230 and the mechanical device 240. The mechanical device 240 may be configured for mechanical work, such as actuating a piston 242, or the like. In this regard, the solid-propellant gas generator system 200 may replace a typical slow burning solid-propellant with a piston 242.

In various embodiments, a fast burning solid-propellant 250 may be disposed in the propellant cavity 222 of the housing 220. The fast burning solid-propellant 250 may comprise ammonium perchlorate, hydroxyl terminated polybutadiene (HTPB) binders, or the like. The fast burning solid-propellant 250 may be configured to ignite via the ignition device 210 and form a fast burning, high pressure, gas. In various embodiments, the solid-propellant gas generator system 200 may be configured to provide a pressure profile over time substantially similar to a slow burning solid-propellant system, as described previously herein.

In various embodiments, the mechanical device 240 comprises a piston 242. In various embodiments, the piston 242 is configured to translate in response to activation of the ignition device 210. In this regard, the ignition device 210 may ignite the fast burning solid-propellant 250 and covert the solid-propellant 250 into a high pressure gas. The high pressure gas may be metered and/or managed by flowing through the orifice 232, resulting in a pressure profile in the pressure chamber 224 that is substantially similar to a slow burning solid-propellant, such as ammonium nitrate propellant, or the like. In various embodiments, the solid-propellant gas generator system 200 may be configured to replace a typical slow burning solid-propellant.

Figure 4:
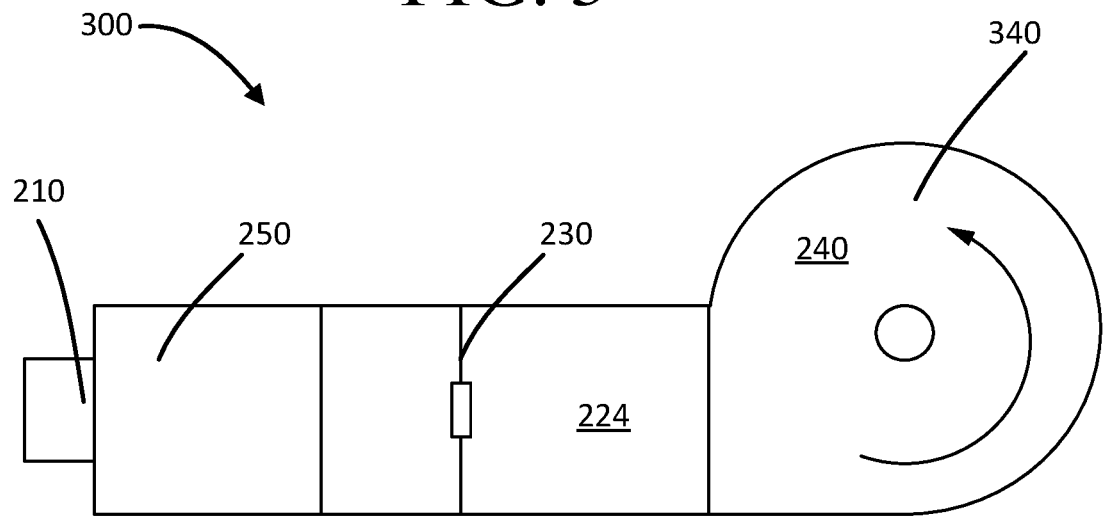
FIG. 4 illustrates a solid-propellant gas generator system, in accordance with various embodiments.

Referring now to FIG. 4, a solid-propellant gas generator system 300, in accordance with various embodiments, is illustrated. The solid-propellant gas generator system 300 may comprise the ignition device 210, the housing 220, the bulkhead 230, the mechanical device 240, and the fast burning solid-propellant 250. In various embodiments, the mechanical device 240 comprises a gas-powered turbine 340. The pressure chamber 224 may be in fluid communication with the gas-powered turbine. In this regard, the ignition device 210 may ignite the fast burning solid-propellant 250 and covert the solid-propellant 250 into a high pressure gas. The high pressure gas may be metered and/or managed by flowing through the orifice 232, resulting in a pressure profile in the pressure chamber 224 that is substantially similar to a slow burning solid-propellant, such as ammonium nitrate propellant, or the like. The pressure profile in the pressure chamber 224 may power the gas-powered turbine 340 in a manner similar to a typical slow burning solid-propellant.

Figure 5:
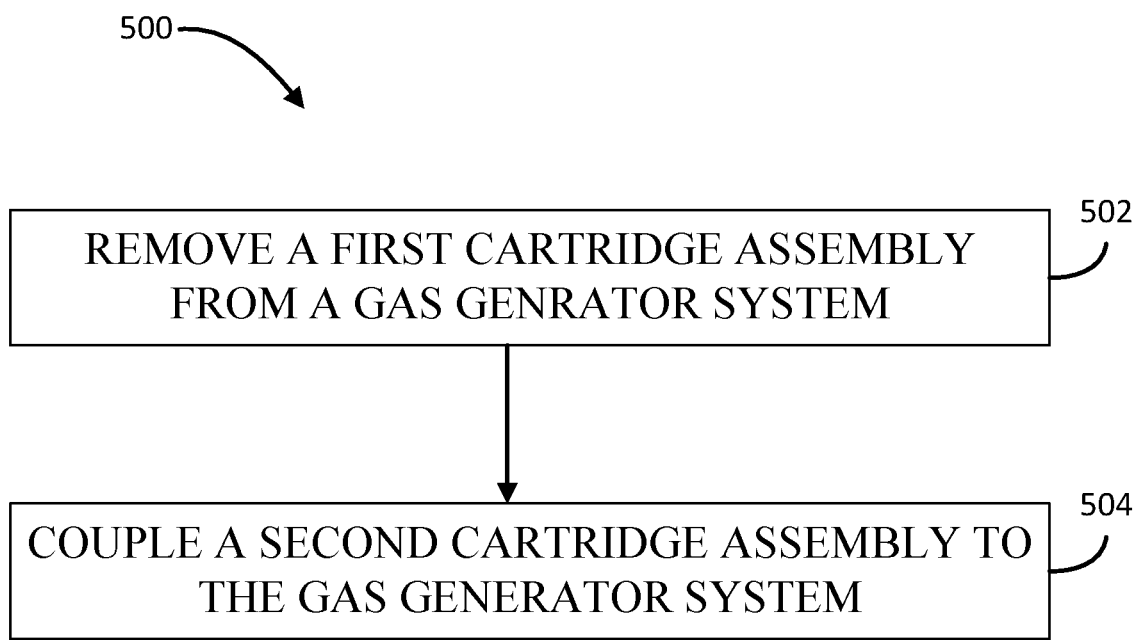
FIG. 5 illustrates a method of retrofitting a gas generator system, in accordance with various embodiments.

Referring now to FIG. 5, a method 500 of retrofitting a solid-propellant gas generator system, in accordance with various embodiments, is illustrated. The method 500 may comprise removing a first cartridge assembly from a gas generator system (step 502). With brief reference to FIG. 6, the first cartridge assembly may be in accordance with cartridge assembly 600. Cartridge assembly 600 may comprise a slow burning solid-propellant 650 disposed in a cavity 622 of a housing 620. The slow burning solid-propellent 650 in communication with an ignition device 610 at a first end 621 of the housing. The slow burning solid-propellant 650 may comprise ammonium nitrate propellant, or the like.

Referring back to FIG. 5, the method 500 may further comprise coupling a second cartridge assembly to the gas generator system (step 504). The second cartridge assembly may be in accordance with cartridge assembly 100 from FIG. 1. In this regard, in various embodiments, a size and/or weight of a cartridge assembly for the solid-propellant gas generator system may be reduced. Additionally, a fast burning solid-propellant 150 may be easier to manufacture relative to a slow burning solid-propellant. In various embodiments, by utilizing method 500, a cartridge assembly utilizing a fast burning solid-propellant may replace a cartridge assembly utilizing a slow burning solid-propellant in a system for gas-powered downstream mechanical work, such as a gas-powered turbine, a gas-powered piston, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of retro-fitting a solid-propellant gas generator system, the method comprising:
    removing a first cartridge assembly from the solid-propellant gas generator system, the first cartridge assembly including a first solid-propellant; and
    coupling a second cartridge assembly to the solid-propellant gas generator system, the second cartridge assembly including a second solid-propellant configured to burn faster than the first solid-propellant, wherein:
        the first cartridge assembly includes a first housing defining a first cavity extending from a first end of the first housing to a second end of the first housing, the first solid-propellant is disposed in the first cavity of the first housing, a first flow of gas from burning the first solid-propellant is configured to flow unobstructed in the first cavity;

the second cartridge assembly further comprises a bulkhead having an orifice disposed in a second housing of the second cartridge assembly, the second cartridge assembly further comprises a propellant cavity defined between a first end of the second housing and the bulkhead and a pressure chamber defined between the bulkhead and a second end of the second housing, the orifice of the second cartridge assembly is configured to meter a flow of gas into the pressure chamber of the second cartridge assembly, and a pressure in the propellant cavity of the second cartridge assembly and the pressure chamber of the second cartridge assembly equalize over time in response to burning the second solid-propellant.

2. The method of claim 1, wherein the first solid-propellant comprises ammonium nitrate propellant, and wherein the second solid-propellant comprises at least one of ammonium perchlorate and hydroxyl terminated polybutadiene (HTPB) binders.

3. The method of claim 1, wherein the first cavity of the first cartridge assembly includes a propellant cavity of the first cartridge assembly that is also a pressure chamber of the first cartridge assembly.

4. The method of claim 1, wherein the first solid-propellant is in a first un-burned state, and the second solid-propellant is in a second un-burned state.

5. The method of claim 1, wherein the first cavity includes a constant diameter.

* * * * *